March 28, 1944. C. L. BEAL 2,344,960
DEPOSITION FORM AND METHOD OF MAKING THE SAME
Filed July 20, 1938
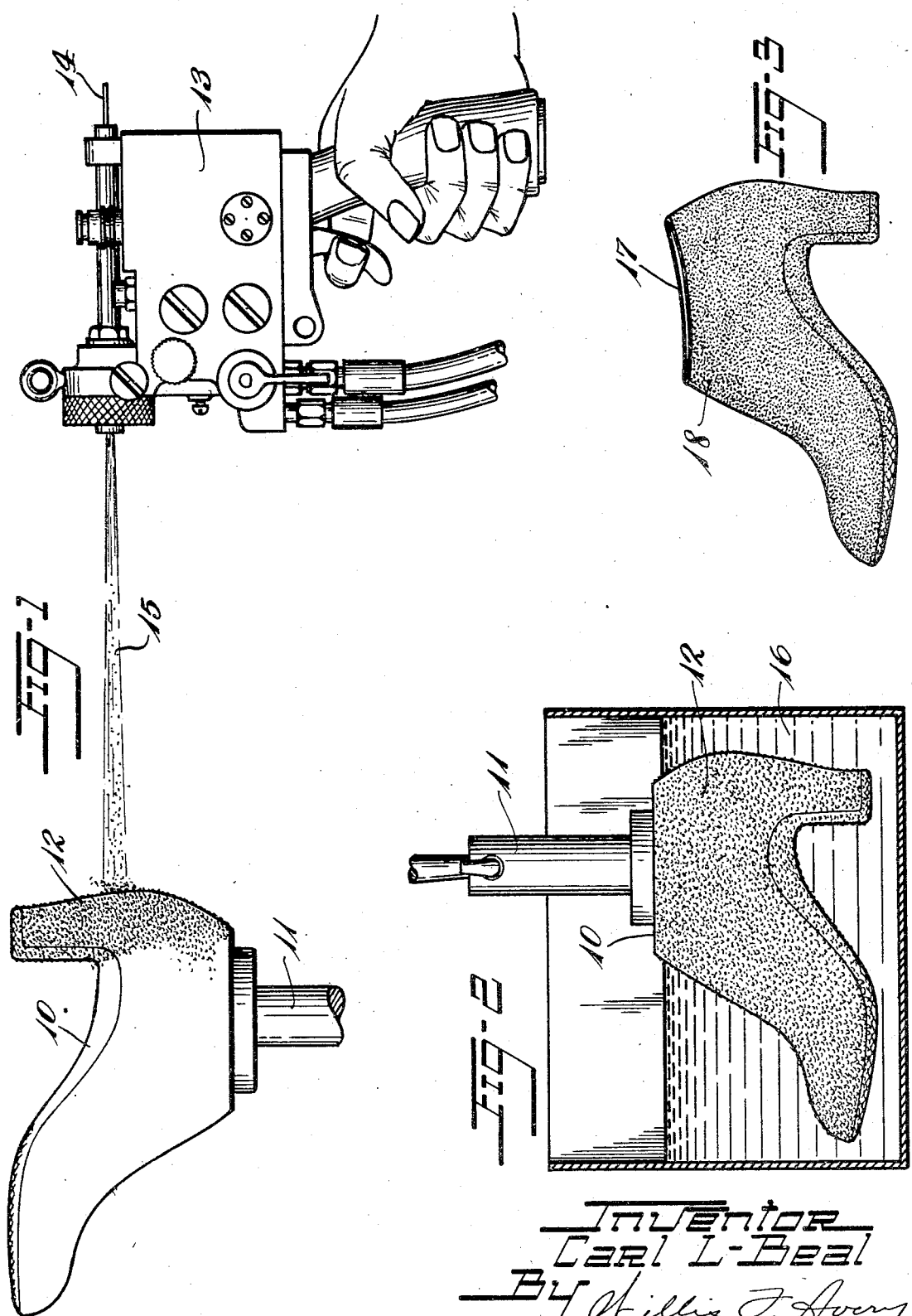
Inventor
Carl L. Beal
By Willis T. Avery
Atty.

Patented Mar. 28, 1944

2,344,960

UNITED STATES PATENT OFFICE 2,344,960

DEPOSITION FORM AND METHOD OF MAKING THE SAME

Carl L. Beal, Cuyahoga Falls, Ohio, assignor to American Anode Inc., Akron, Ohio, a corporation of Delaware Application July 20, 1938, Serial No. 220,314

5 Claims. (Cl. 18—41)

This invention relates to deposition forms for use in the manufacture of rubber and other articles and especially to deposition forms for use in producing rubber articles having rough surfaces by processes in which rubber is deposited upon a form from a liquid rubber composition, and to methods of making such deposition forms.

Many rubber articles such as gloves, overshoes, bathing caps and the like are now made by coating an appropriately shaped deposition form with a liquid rubber composition and solidifying the composition on the form to produce a rubber deposit constituting the desired article. It is frequently advantageous for both utilitarian and decorative purposes to produce such rubber articles with rough surfaces. For example, rubber gloves have been provided with rough surfaces to improve the frictional characteristics and impart non-slip properties to the gloves, and uppers of overshoes have been provided with rough surfaces to improve the appearance of the shoes. Varied expedients have been proposed for obtaining such rough surfaces in deposited rubber articles but no method heretofore proposed has proven entirely satisfactory. In some prior methods, the character of the rough surface obtained has not been eminently satisfactory. In other methods, while excellent rough surfaces have been obtained, practical difficulties have been encountered in adapting the methods to commercial production conditions. Furthermore, the methods now in commercial use for producing rough non-slip and decorative surfaces on deposited rubber articles usually involve treatment of the rubber article itself, after the deposition is completed, to effect a roughening of the initially smooth rubber deposit. Such procedures, of course, require an added step in the manufacturing process and increase the handling necesssary during manufacture. These and other factors raise the manufacturing costs considerably and have militated against widespread adoption of such processes.

It is accordingly the chief object of the present invention to provide simple, economical and efficient procedure and apparatus for producing deposited rubber and like articles having rough surfaces of an exceptionally satisfactory nature. More specifically, the invention aims to provide novel deposition forms for producing such articles with rough surfaces directly from latex or other coating compositions without any added step of treating the rubber article itself to effect the requisite roughening, and to provide simple, economical and efficient procedures for making such deposition forms. The manner in which these and other objects of the invention are attained will be apparent from the following description of a specific example which is understood to be merely illustrative and not limitative of the invention. In the description, reference will be had to the accompanying drawing of which Fig. 1 is a more or less diagrammatic elevation illustrating one method of producing a rough surfaced deposition form according to the present invention and showing the operation of spraying globules of molten metal on a metal base member constituting the body proper of the form;

Fig. 2 is a sectional elevation illustrating one method of using the form of Fig. 1 in producing a rubber article and showing the form immersed in a liquid rubber composition; and Fig. 3 is an elevation of a finished rubber article, namely a rubber overshoe, having a decorative rough surface produced upon a deposition form embodying the present invention.

As the present invention has been found to produce rubber articles having rough surfaces simulating certain types of pebbled leather with unusual fidelity and as such leather-like surfaces are especially valuable for enhancing the appearance and sales appeal of rubber overshoes, the invention will be described as applied to the manufacture of an all-rubber overshoe.

In the specific example illustrated in the drawing, I first provide a rigid base member 10 having the shape of the overshoe to be produced and being provided with a supporting extension 11 in the customary manner. The base member 10 may be formed of aluminum and preferably has a smooth surface at the areas where a leather-like roughness is desired in the rubber shoe, although the sole and heel tread portions of the member may be engraved for molding a desired tread configuration in the shoe, and other engravings may be provided if desired to mold decorative ridges or other features in the shoe.

The portions of the base member where a leather-like surface is desired in the rubber shoe are then treated by spraying or otherwise applying globules of molten aluminum metal thereon in a limited quantity insufficient to form a smooth coating but only to deposit a multitude of more or less definitely spaced apart globules in scattered disposition on the smooth base surface. On cooling, the globules solidify quickly and adhere to the aluminum base member to provide a multitude of more or less isolated projecting rigid masses of aluminum metal in scattered disposition providing a rough molding surface indicated by the reference numeral 12. The aluminum metal may be sprayed by means of a conventional metal spray gun 13 which receives an aluminum wire 14, melts the wire in a gas flame, and, by means of compressed air, atomizes the molten metal and projects it as a stream of molten metal globules 15.

The character of the surface obtained may be varied considerably of course by varying the several inter-related factors influencing the spraying operation such as adjustment of the spray gun, distance of the gun from the base member, relative speed of travel of the gun with respect to the base member and the like, but no particular set of conditions is necessary to obtain a useful rough surface. It is essential only that the stream of sprayed metal not be directed at any one surface area long enough to build up a smooth coating of metal and, preferably, that the stream be directed at any given area long enough only to apply definitely isolated globules of metal, although some convergence of the globules at the interface between the globules and the base member is not undesirable. Observation, of course, will immediately indicate when sufficient metal has been sprayed. Ordinarily a single passage of the spray at a fairly slow rate of about fifteen feet per minute past a given area will produce an excellent rough surface.

In the case of the shoe form, the entire exposed surface of the form may be sprayed with aluminum in the manner described to provide the finished deposition form shown in Fig. 2, the isolated small masses of metal projecting from the smooth base member to present a rough surface as indicated at 12.

The deposition form so prepared is then used in producing rubber or other articles by coating the form in any conventional manner as by spraying, dipping, or brushing, with a liquid coating composition. For example, the form may be immersed in a liquid coating composition 16 which may be a compounded liquid rubber latex or a solution of rubber in an organic solvent to receive a coating deposit of rubber which, after being dried, vulcanized, stripped from the form and reversed, will constitute an all-rubber overshoe 17 (Fig. 3).

The surface of the finished overshoe is found to be finely pitted as indicated by the stippling 18, the pits of course corresponding to the projecting masses of sprayed metal on the deposition form, and to present an unusually pleasing appearance resembling pebbled leather to a remarkable degree.

In addition to the decorative appearance, such pitted surfaces have excellent non-slip characteristics and are quite useful in surgeon's rubber gloves and other rubber gloves such as the so-called household gloves where non-slip characteristics are important. The invention is not limited to the production of forms for making any particular article, however, nor is it limited to forms for making rubber articles. On the contrary, the present forms may be utilized in making any articles which are made by molding a plastic composition in contact with a molding surface.

Substantial economies are effected by providing deposition forms which will produce the desired rough-surfaced articles directly from a rubber or other coating composition without the necessity of treating the deposited rubber itself to effect the requisite roughening. Large numbers of forms embodying the present invention may be prepared quickly and economically and with substantially uniform, although not identical, molding surfaces. The slight variations in the character of molding surfaces obtained from form to form necessarily resulting from variations inherent in a spraying operation are not undesirable but, on the contrary, lend a certain distinction to rubber and other articles molded on the forms as they appear to have been the subject of individual treatment rather than the products of mass production operations.

A wide variety of metals including lead, tin, zinc, stainless steel, iron, nickel, "Monel" metal and the like may be sprayed with equipment now available commercially and may be utilized in practicing the present invention. Fusible materials other than metals, such as heat-plastic natural and synthetic resins may be melted and sprayed in a molten condition in a similar manner. Satisfactory results likewise may be obtained by utilizing other solids which may be reduced to or initially prepared in a condition suitable for spraying other than by melting and which will solidify to form rigid projecting masses after being applied in globular or small particle form to an appropriate base member. For example, hydraulic cements such as Portland cement, magnesia cement, or plaster of Paris and similar cementitious composition such as porcelain and other vitreous compositions may be prepared in a pasty, semi-liquid, or liquid state by admixture of water and then applied as by spraying in limited quantities onto a ceramic or other base member, to provide, after baking where required by the nature of the composition, an excellent rough surface comprising upstanding masses of rigid solid ceramic material, the term "ceramic material" being here understood to include all such cementitious and vitreous compositions. Materials such as "Bakelite" resins may be dusted or sprayed in powder form or sprayed in the form of a suspension in water or other vehicle onto a base member formed of a similar material and thereafter subjected to heat to convert the resin to the nonthermoplastic form, the resin of course being applied as separate scattered particles as hereinabove indicated to provide a rough surface on the base member. It is therefore understood that all such materials reduced to or prepared in a more or less fluid form suitable for spraying or similar application to the base member are included within the language "solid material temporarily reduced to a fluid state for application to the base member but being capable of solidification to produce rigid solid masses" as employed in the claims.

The base member usually will be made of the same material as that being sprayed, but this is not essential to the invention and the base member may be made of any suitable material to which the sprayed or otherwise applied globules or particles will adhere and which is not damaged by the temperature or other factors involved in the process.

All such modifications and variations are within the scope of the appended claims unless otherwise specifically indicated.

I claim:

1. A deposition form comprising a base member of rigid material and a multitude of relatively small distinct masses of globular configuration comprising rigid material adhered to the surface of the base member in scattered disposition providing a rough surface adapted to produce leather-like finishes in articles deposited thereon.

2. A deposition form comprising a base member of rigid material and a multitude of rigid distinct masses of globular configuration comprising initially fluid material solidified in situ and adhered to the base member in scattered disposition providing a rough surface adapted to produce leather-like finishes in articles deposited thereon.

3. A deposition form comprising a metallic base member and a multitude of distinct globular metal masses adhered to the surface of the base member in scattered disposition providing a rough surface adapted to produce leather-like finishes in articles deposited thereon.

4. A deposition form comprising a base member of rigid material having an exposed zone of substantial extent rendered rough by a multitude of more or less isolated projecting small distinct masses of rigid solid material permanently adhered thereto in random disposition characteristic of the deposition produced by spraying, said masses having the generally globular configuration characteristic of masses produced by solidification in situ from a fluid state.

5. A deposition form comprising a base member of rigid material having substantially the shape of an article to be produced thereon, said base member having a zone of substantial extent rendered rough by a multitude of more or less isolated projecting distinct masses of solidified fusible material permanently adhered thereto in random disposition characteristic of the disposition produced by spraying, said masses having the generally globular configuration characteristic of masses produced by solidification in situ from a fused state.

CARL L. BEAL.